Patented Jan. 13, 1948

2,434,291

UNITED STATES PATENT OFFICE 2,434,291

MARINE ANTIFOULING STEEL BASE

Howard E. Smith, Kew Gardens, N. Y., assignor to Insl-X Corporation, Brooklyn, N. Y., a corporation of New Jersey No Drawing. Application September 4, 1942, Serial No. 457,318

1 Claim. (Cl. 117—127)

My invention relates to a new class of anti-fouling compounds for preventing marine deposits on the submerged surfaces of ships and other marine structures and more particularly my invention relates to anti-fouling compounds that have the necessary toxic properties for substantially preventing marine fouling of ferrous structures and at the same time not augmenting corrosion of the metal surface on which it is used.

The bottoms of ships and similar exposed portions are rapidly fouled in ocean waters. Fouling, as will be explained hereinafter, means the attachment to the submerged portion of a great variety of marine organisms ranging from unicellular microorganisms such as bacteria progressively up to relatively large marine animals such as barnacles, crabs, clams and snails. This fouling is a material factor since the incrustation or attachment of the marine organisms on to the submerged portion seriously impedes the speed of the vessel and thus increases fuel comsumption and travelling time.

The removal of such marine fouling organisms is both a lengthy and expensive task and means that the ship is tied up and out of use for a good period of time. The problem is particularly serious when the ships travel in tropical waters for there the marine organisms exist in greatest numbers and varieties and conditions are most conducive for their development.

The ships' bottoms and similar parts which are involved are formed of metals such as steel and similar other ferrous metals.

It is the common practice in the art to apply to such underwater parts to be protected, a coating of paint, varnish or other finish designed to physically protect the metal base and it is also common practice to incorporate in such protective vehicle anti-fouling agents to prevent marine fouling.

The organisms involved in marine fouling are almost endless in number and depend, inter alia, upon the season and location of the sea water geographically. The marine organisms involved are deleterious not only because of their physical incrustation and impairment of the ship's movement in the water, but also because certain forms of such organisms accentuate corrosive attack on the metal of the ship.

It has been customary to retard this fouling of the ships' bottoms by marine organisms by including mercuric or cuprous oxide as toxic agents in the paint or other finish applied to the steel. Although such mercuric or cuprous oxides have a certain efficiency in retarding marine fouling they are by no means satisfactory or sufficiently effective for practical purposes.

Moreover, besides being deficient in anti-fouling efficiency, the mercuric oxide and cuprous oxide anti-fouling agents employed are undesirable because when freed to attack the marine growths in their anti-fouling function the metals by an electrochemical displacement action attack the steel of the ship's bottom. This corrosive action, unlike the marine organisms which can be removed by scraping, cannot be remedied and in an undesirably short period of time such steel or other metal surfaces are seriously affected.

It is the object of the present invention, therefore, to provide a novel class of anti-fouling compounds and certain specific anti-fouling compounds of that class which have a high anti-fouling efficiency.

It is another object of the present invention to provide certain anti-fouling compounds which under moderate marine conditions substantially prevent fouling by marine organisms and under conditions such as tropical conditions, where there is a maximum number of marine organisms encountered, and conditions are most favorable for their development, to substantially retard such marine fouling.

It is a further object of the present invention to provide efficient anti-fouling compounds that are non-corrosive to steel and other ferrous metals.

I have found that such objects can be accomplished by the use as an anti-fouling compound of phenyl mercury compounds, and specifically, for example, phenyl mercury borate, phenyl mercury phthalate and phenyl mercury salicylate.

Other objects of this invention will be apparent from a consideration of the specific description of my invention which here follows.

The fouling of a ship's bottom is due to the attachment thereto of various marine organisms. Although there is a certain conflict in this art as to the exact effect on the metal of the microorganisms of marine growth, it is an established fact that such marine fouling, that is that the attachment onto the steel of other ferrous metal ships' bottoms of various marine organisms, builds up an organic layer that impedes out of all proportion to its size the travel of the ship in the water. Many of the marine growths also are definitely known to cause attack on the metal in one way or the other.

As stated above, the organisms vary considerably both in conformation, type and speed of attachment, depending on whether the water is temperate or tropical. In the Caribbean Sea, for example, marine growth is extremely widespread and multitudinous and ships moored in the water there for only relatively short periods of time quickly are subject to fouling.

The first attachment to the metal in the water are microorganisms such as bacteria and protozoa. These organisms build up various slimes and films to which films in turn attach various of the higher forms of marine life which are set out here specifically in classified form.

Group 1—The unicellular microorganisms composed of many species of bacteria and other plant life, and various types of protozoa.

Group 2—The macro- or multicellular organisms, both plant and animal.

These groups might be further divided as follows:

1. Microbiological (unicellular, film-forming)
    A. Bacteria
    B. Fungi
    C. Diatoms
    D. Protozoa (Vorticella, Suctoria, etc.)
2. Macrobiological (multicellular, encrusting or fouling)
    A. Sessile
        1. Porifera (Sponges, calcareous or silicious)
        2. Coelenterata (Tubularia, Bougainvillia, Campanularia, and many other genera and the calcareous Corals)
        3. Bryozoa (Bugula, Electra, etc.)
        4. Annelids (Serpulidae)
        5. Arthropoda (Cirrepedia, Barnacles, etc.)
        6. Mollusca (Ostrea (oysters), Anomia, Chama, Vermetus and many others)
        7. Chordata (Botryllus, Molgula, etc.)
        8. Algae (Polysiphonia, Ceramium, Ulva, Fucus and many others)
    B. Semi or optionally motile
        1. Coelenterata (Metridium (sea Anemones) and other allied genera)
        2. Annelida (Worms)
        3. Arthropoda (Corophium and other crustacea which form temporary protective tubes)
        4. Mollusca (Mytilus, Modiola and others with holdfasts of Chitinous hairs)
        5. Echinodermata (Asterias (starfish) etc.)
    C. Motile, but contributing some additional material, generally mucous to the film over which they pass
        1. Annelida (Polychaeta and other free-swimming worms)
        2. Arthropoda (Cancer (crabs) and many other genera)
        3. Mollusca (Nudibranchiata (sea slugs) and many genera of Gasteropoda (snails) and Pelecypoda (clams)
        4. Echinodermata (Ophiurae (brittle stars) etc.)

This type of classification is much more useful and accurate than commonly used designations such as Hydroids, Anipedes, Algae, etc. Theoretically there may be present on a hull bottom representative species of all phylum, orders and families from microbiological bacteria to motile macrobiological species, but naturally on any given panel a smaller number are present depending on local conditions.

This list, although it includes a large number of marine growths is restricted to those forms of marine life found in the temperature waters of the North Atlantic and does not include the far greater number of genera and species found in the tropical waters of the Caribbean or other tropical waters of the world. These can be found in any of the standard textboooks on biology and particular reference is made to "The Sea Beach at Ebb Tide," Augusta Foote; "Preliminary Studies on the Distribution and Characteristics of Marine Bacteria," C. E. Zobell and C. B. Feltham, Bulletin, Scripps Institute Oceanog. Tech. Serv. 3:279–296, 1934; and "The Significance of marine bacteria on fouling of submerged surfaces," C. E. Zobell and E. C. Allen, Journal of Bacteriology, vol. 29, No. 3, 1935.

The microbiological film forming organisms mentioned above appear very quickly on metal parts submerged in salt sea water. In fact most species of film forming bacteria do not thrive or multiply very rapidly until they become attached to some such base. When the film forming bacteria do attach themselves to the metal surface, they secrete or exude a film of gelatinous or mucilaginous material in which they are embedded. Tests show that when such a film is formed even on polished glass, swiftly running water will not remove it. It is tenacious and adherent to the surface.

The major portion of this film is made up of numerous forms of bacteria, but certain fungi, molds, diatoms and protozoa are usually present. Most of the bacterial portion of the film is composed of colonies formed by development from the single individuals which have fastened themselves to the surface rather than by adhesion of later arrivals.

In normal salt water, the surface of the steel plate can be completely covered with a microbiological film in but a few hours. In addition to the film forming bacteria various other forms are present, including dentrifying bacteria which precipitate calcium carbonate from the sea water. Such bacteria may account for at least some of the calcium carbonate coatings found on metals submerged in salt water.

It has also been stated that certain sulfate reducing bacteria are present in the microbiological films, but the sulfate found in such films is believed to originate from algae.

These bacterial films are not static but in most instances act upon the protective coatings of the steel bottom. When the subsequent larger marine animals attach themselves to this film the film is often penetrated or broken and thus the metal itself becomes susceptible to attack and corrosion.

The multicellular marine organisms which constitute the chief problem in marine fouling rarely attach themselves to a submerged surface until the microorganism or bacterial film has been formed. All such fouling or incrusting macroorganisms or multicellular organisms become attached as microscopic embryos. This is true both of plant and animal life. The gelatinous sticky surface of the microbiological film provides a much more satisfactory foothold for this purpose than does the clean bare metal. Upon the nature of this base film depends also the firmness of attachment of the embryos of the larger organisms. To some extent the effect of a larger organism on the metal depends upon the firmness of its attachment. The macroorganisms which sometimes include worms, starfish, crabs, sea slugs, snails, clams, brittle stars, as well as the common fouling species and others listed in the grouping above, gradually accumulate and attach themselves securely in the form of a heavy incrustation on the ship's bottom.

These marine organisms do not all live simultaneously but many die in their attached position and are succeeded and overlaid by other organisms.

The damaging effects of this incrustation do not result altogether from the physical impairment of the movement of the ship in the water resulting from the heavy irregular incrustation or the added weight thereof, but there is additionally a corrosive action on the protective covering and on the steel or other ferrous metal itself that results from one or more of the following: acid or corrosive fluid secretion that acts upon the metal; the powerful digestive fluids of the stomach and alimentary canal of some of the marine invertebrates that may accelerate corrosion; the decaying animal matter of dead organisms that produce sulfur and other constituents causing excessive corrosion; incrusting organisms that may form oxygen concentration cells resulting in corrosion either directly beneath or around the periphery of the base of the organisms.

Although there is some evidence to indicate that certain of the organic films formed over the protective coatings are in themselves protective and prevent corrosion or attack on such finishes on metal, even such protective films are penetrated and partially destroyed by the subsequent attachment of the larger marine organisms such as barnacles.

Certain of the marine organisms, such as *Balanus eburneus*, have an additionally destructive function since while growing in place after attaching themselves in the embryonic state they build a more or less solid base of calcium carbonate. This calcium carbonate base penetrates through the protective coating including for example the paint or other protective vehicle and as the organism grows the calcium carbonate base by which the Balanus is attached also grows. The base during growth enlarges horizontally rapidly. In penetrating, the base during its attachment and in the course of its growth exerts a considerable vertical as well as horizontal pressure on the paint.

The base may be forced completely through a one-eighth inch or more of coating until the entire outer circumference of the base of the Balanus is entirely in contact with the bare metal beneath the paint. In such case an examination of the underside of the barnacle base shows that it is conical rather than flat as it normally is and that this cone is filled with the protective coating or paint through which the organism has gradually forced its way.

The effect of the mechanical strains thus induced has been observed in many types of protective coatings and varies from microscopic depressions to deep pits. The stress developed by the horizontal growth of the organism is such that when the organism is removed or falls off, it carries with it the entire paint area which is directly beneath and adjacent to the organisms, while the paint may remain firmly attached outside of this particular area.

Thus, generally speaking, all marine growths and fouling incrustations are undesirable from a number of different standpoints and for the most efficient service and for the preservation of the ship's bottom against corrosion, it is preeminently desirable that such fouling be prevented.

As set out hereinabove toxic agents such as cuprous and mercuric oxides have been employed in paints to retard such fouling. These agents have been only moderately successful, however, and have the serious drawback that upon the release of the mercury or copper in the course of their being dissolved by sea water, the mercury and copper so released act not only as toxic agents to retard the development of the marine organisms, but also corrode the steel bottoms by an electrochemical displacement action.

This corrosion which constantly progresses is a serious fact and greatly shortens the normal life of the steel bottom.

I have found that the phenyl mercury compounds and particularly for example phenyl mercury borate, phenyl mercury phthalate and phenyl mercury salicylate are toxic agents which may be added to the protective coatings such as the paints applied to the ships' bottoms.

These substances have many characteristics as toxic agents that make them unusually desirable over the anti-fouling compounds suggested in the prior art.

First, they are far superior to any of the agents of the prior art in effecting the primary desideratum of such agent, namely preventing the fouling of a steel surface such as a ship's bottom.

A number of tests were run of marine panels which were exposed at Sayville, Long Island, New York, using various anti-fouling agents including the agents suggested herein and the results of the observations of such treated panels at the end of a period of four weeks and then at the end of a period of eight weeks are listed below.

The anti-fouling action set out in the following tests is the same for steel and aluminum and other light metal base materials since the base material is covered with the protective vehicle such as the paint, varnish or lacquer. The action is different, however, as far as corrosion is concerned and the base metal is differentially affected by the anti-fouling compounds employed. The phenyl mercury compounds of the present invention are particularly distinguished by their lack of corrosive activity on the metal base.

| Panel No. | Toxic Agent | Vehicle | Observation at end of— | |
|---|---|---|---|---|
| | | | 4 weeks [1] | 8 weeks [2] |
| 1 | Mercuric oxide | Glyceral phthalate | slight | slight. |
| 2 | Cuprous oxide | do | moderate | moderate. |
| 3 | Phenyl mercuric salicylate | do | absent | absent. |
| 4 | Mercuric oxide | Para phenyl phenolic | slight | slight. |
| 5 | Cuprous oxide | do | moderate | moderate. |
| 6 | Phenyl mercuric salicylate | do | absent | absent. |
| 7 | Mercuric oxide | 2 gal. linseed oil, rosin var | slight | slight. |
| 8 | Cuprous oxide | do | moderate | moderate. |
| 9 | Phenyl mercuric salicylate | do | absent | absent. |
| 10 | Phenyl mercuric phthalate | Chlorinated rubber | do | Do. |
| 11 | Copper resinate | do | slight | slight. |
| 12 | Mercuric oxide | do | do | Do. |
| 13 | Electrolytic copper | do | considerable | considerable. |
| 14 | Zinc cyanide | do | do | Do. |
| 15 | Phenyl mercuric salicylate | do | absent | absent. |
| 16 | Phenyl mercuric borate | do | do | Do. |
| 17 | Copper oliate | do | considerable | considerable. |
| 18 | Cuprous oxide (red) | do | do | Do. |
| 19 | Cuprous oxide (yellow) | do | moderate | moderate. |

[1] 4 weeks—slight deposit of slime principally of microscopic organisms.
[2] 8 weeks—deposit consisted of thin mat of silt and algae, including enteramorpha and heavy growth of chain diatoms. Many corophium present as well as some polychaet.

Observations made after a 12 week period showed the same relative differences although the total fouling was much heavier reaching in the case of the prior art anti-fouling agents a thickness of approximately one-quarter inch.

It should be noted that the tests reported above were conducted in ocean waters at Long Island, New York, which are quite temperate waters. In the tropical or semi-tropical waters which must be encountered in long ocean trips the marine organisms are present in far greater number of species and a far greater number per unit area of water and develop much more rapidly.

Thus the differences between the absence of fouling in the case of the phenyl mercury compounds and the slight, moderate or considerable fouling resulting from the use of other toxic agents are greatly increased under tropical marine conditions.

Tests conducted at Mobile, Alabama, in the waters of the Gulf of Mexico show the same relative advantages of the phenyl mercury compounds set forth herein over the anti-fouling agents previously used. Even under the most severe conditions when great numbers of organisms and swarms of barnacle larvae are present, the phenyl mercury compounds, although not completely preventing fouling, are markedly superior in retarding fouling over the anti-fouling agents previously suggested.

Continuation of these tests at Mobile showed that even under the most severe conditions and for extended periods of time the barnacle larvae which are present in great quantities, after attaching themselves to the metal protected by the anti-fouling agent here disclosed were killed by the toxic agent and sluffed off having never undergone metamorphosis.

On the basis of actual tests such as those set out above the phenyl mercury compounds, particularly those exampled, are the only toxic agents that completely prevent fouling for reasonable periods of time and under normal marine conditions. Once fouling has started, as it does when either no toxic agent or the only moderately effective toxic agents, certain of which are listed above, are employed, it progresses rapidly because the film and organism deposit that forms on the surface provides an attractive base for more and larger marine organism attachment.

The phenyl mercury anti-fouling agents have the new and unexpected result of being substantially free from any corrosive action on the steel or other ferrous metal to which they would be customarily applied. That is, they overcome the difficulty hitherto experienced when the mercury or copper compounds employed corrosively attacked the metal base in the course of their solution from the finish. This corrosive action seriously affected the metal by pitting and greatly shortened the life of the steel or like metal base on which it was employed.

The following tests show that the phenyl mercury compounds are actually beneficial in so far as corrosion of steel is concerned, since the loss in grams was less when phenyl mercury compounds were employed than in the control itself, whereas in the use of the other toxins, the loss in grams was at least that of the control and ordinarily much greater.

| Toxicant | Loss in Grams Sq. In.—14 days |
|---|---|
| Phenyl mercury phthalate | .0061 |
| Mercuric oxide | .0117 |
| Metallic copper | .0100 |
| Phenyl mercury salicylate | .0038 |
| Phenyl mercury borate | .0028 |
| Copper chromate | .0152 |
| Red cuprous oxide | .0618 |
| Yellow cuprous oxide | .0207 |
| Copper oxy chromate | .0088 |
| Control (no toxicant) | .0100 |

This non-corrosive property is probably due to the fact that the mercury is not released upon the dissolution of the phenyl mercury compound in the course of its submersion in sea water but the mercury is always tied up with the compound, the compound acting in such combined form to effect the toxic or anti-fouling action, the positive ion being the phenyl mercury complex.

This peculiar function of the anti-fouling compounds here set forth in performing their toxic or anti-fouling functions without releasing of the mercury is of importance not only because the mercury is thus held in combination and prevented from corrosively acting upon the metal base of the finish but also because of the improved toxic action obtained.

It should also be noted that these compositions theoretically do not appear to be good anti-fouling agents. First, because the phenyl radical is not indicated as having any toxic action of the nature necessary and the mercury which might in free form have such toxic action is tied up with the phenyl and not released in the course of its dissolution in salt water. Further, the borate, phthalate and salicylate radicals are substantially non-toxic, as is well known, and certainly are not indicated or suggested by their nature as anti-fouling for marine organisms, or toxic for the purposes of preventing attachment of marine organisms.

Thirdly, phenyl mercury compounds are desirable agents over those suggested in the prior art because of their low specific gravity. These compounds have an apparent density of .7 which is substantially lower than the toxic agents hitherto employed, and while the true specific gravities are high, they are much less than the oxide or chloride, the only other salts that approach these in effectiveness.

The phenyl mercury compounds here proposed as anti-fouling agents are possessed of a great effectiveness because they have the property of general protoplasmic poisoning agents that are individual cell destroyers. Thus, in contradistinction to specific poisons that may affect nerves or the nervous system or have other specific poisoning functions, the compounds here set forth have the property of toxically affecting and destroying each individual cell. They are therefore extremely effective. It is believed that the phenyl group acts in the nature of a wetting agent and thus brings the mercury into intimate contact with adjacent cells.

That is, it is believed that although theoretically the phenyl mercury group would not appear to ionize and make available free mercury and thus would appear to be less effective than the compounds of the prior art that do so, it appears to be a fact that the phenyl mercury group is lyophylic or organophylic and thus serves as a carrier which enables the mercury to gain effective contact with the organism structure.

In the tests mentioned hereinabove in which the phenyl mercury anti-fouling agents were proven under severe conditions in the Gulf of Mexico at Mobile, Alabama, it was found that when a percentage of the phenyl mercury compound amounting to 25% by weight of the vehicle was employed, the test panels maintained their cleanliness for five weeks, which coresponds to an avoidance of fouling on the bottom of a vessel in service for many months.

The phenyl mercury compounds and specifically the phenyl mercury borate, phenyl mercury phthalate and phenyl mercury salicylate are used by addition to the ordinary paint or finish vehicles commonly used to coat the steel or other ferrous metal structures, in the proportion of 10 to 100 parts by weight of the phenyl mercury anti-fouling compound to 100 parts by weight of the paint or finish. These proportions, of course, can be varied depending upon the specific conditions to be met.

Various finishes were tested including cellulose derivatives, natural gum spirit solutions, varnishes and synthetic resin finishes of various types to determine the most suitable paint vehicle. The phenyl mercury compounds were stable in all vehicles except those of an extremely acid nature. Of the synthetic resins, the glycerol phthalate oil modified types, the pure oil soluble phenolic such as the para-phenyl phenol formaldehyde reaction produced in oil varnishes of different lengths, the acrylic ester resin system, particularly the mixed butyl and isobutyl methacrylate, chlorinated rubber, vinyl chloride-vinyl acetate copolymer systems are particularly useful for hull bottoms although other vehicles may be employed. Drying time, hardness, weight, service life desired, and such characteristics will determine the proper choice of vehicle since as far as I have determined the phenyl mercury compounds are effective in even the most impermeable vehicles. Chlorinated rubber seems particularly desirable as a vehicle because it is relatively impermeable and seems to have the most inherent immunity for the attachment of certain species.

The anti-fouling agent and the paint should be thoroughly admixed to gain uniform homogeneous dispersion of the phenyl mercury compound in the paint or other vehicle.

This so compounded anti-fouling agent and paint is then applied by methods well known in the art to the metal base structure which they are to protect.

My experiments have shown that superior results may be obtained by employing as an added inhibitor of corrosion certain chromates including strontium chromate, zinc tetra oxy chromate, barium chromate, calcium chromate and suitable chromate salts of magnesium, lithium or aluminum. It is to be understood that the term chromate salt includes in addition to the simple chromate, the complex chromate structures similar to zinc yellow.

Various other modifications of my invention will suggest themselves to those skilled in the art. I accordingly desire that in construing the breadth of the appended claim that it shall not be limited to the specific details shown and described in connection with the above explanation.

I claim:

In combination a steel base and an anti-fouling protective coating therefor comprising a film forming component and phenyl mercury phthalate, said phenyl mercury phthalate being present in an amount of at least 10% by weight of said film forming component.

HOWARD E. SMITH.

REFERENCES CITED

The following references are of record in the file of this patent:

UNITED STATES PATENTS

| Number | Name | Date |
| --- | --- | --- |
| 1,087,145 | Schoeller | Feb. 17, 1914 |
| 2,097,339 | Patterson | Oct. 26, 1937 |
| 2,389,229 | Young | Nov. 20, 1945 |

FOREIGN PATENTS

| Number | Country | Date |
| --- | --- | --- |
| 23,010 | Great Britain | Oct. 8, 1909 |